United States Patent [19]
NA

[11] Patent Number: 6,125,367
[45] Date of Patent: Sep. 26, 2000

[54] MAP DATA BASE MANAGEMENT METHOD AND SYSTEM THEREFOR

[75] Inventor: Seong Wuk NA, Seoul, Rep. of Korea

[73] Assignee: Samsung Electronics Co., Ltd., Kyungki-Do, Rep. of Korea

[21] Appl. No.: 08/956,463

[22] Filed: Oct. 23, 1997

[30] Foreign Application Priority Data

Oct. 23, 1996 [KR] Rep. of Korea ...................... 96-47806

[51] Int. Cl.[7] .................................................. G06F 17/30
[52] U.S. Cl. ...................... 707/104; 701/200; 701/201; 701/207; 701/208; 701/209; 701/212; 707/102; 707/2
[58] Field of Search .................................. 701/207, 208, 701/200, 201, 212, 209; 707/104, 102, 2

[56] References Cited

U.S. PATENT DOCUMENTS

| | | | |
|---|---|---|---|
| 4,360,876 | 11/1982 | Girault et al. ........................ | 364/449 |
| 4,513,377 | 4/1985 | Hasebe et al. ........................ | 364/449 |
| 4,675,676 | 6/1987 | Takanabe ............................. | 340/995 |
| 4,737,916 | 4/1988 | Ogawa et al. ........................ | 364/443 |
| 4,873,513 | 10/1989 | Soults et al. ........................ | 340/723 |
| 5,030,117 | 7/1991 | Delorme . | |
| 5,199,072 | 3/1993 | White et al. ........................ | 380/44 |
| 5,274,560 | 12/1993 | LaRue ................................. | 364/444 |
| 5,444,618 | 8/1995 | Seki et al. ........................... | 364/420 |
| 5,445,524 | 8/1995 | Jones . | |
| 5,472,239 | 12/1995 | Trujillo .............................. | 283/34 |
| 5,694,534 | 12/1997 | White et al. ........................ | 395/140 |
| 5,696,684 | 12/1997 | Ueberschaer ........................ | 364/443 |
| 5,748,867 | 5/1998 | Cosman et al. ..................... | 395/130 |
| 5,835,236 | 11/1998 | Barbari .............................. | 358/442 |
| 5,848,375 | 12/1998 | Nunobki et al. .................... | 701/212 |

FOREIGN PATENT DOCUMENTS

| | | |
|---|---|---|
| 3-244081 | 10/1991 | Japan . |
| 6-60298 | 3/1994 | Japan . |
| 6-46343 | 6/1994 | Japan . |
| 7-181890 | 7/1995 | Japan . |

*Primary Examiner*—Anton W. Fetting
*Assistant Examiner*—Jean M. Corrielus
*Attorney, Agent, or Firm*—Sughrue, Mion, Zinn, Macpeak & Seas, PLLC

[57] ABSTRACT

A map data base management system comprises a map data base storage unit for storing a map index file so that with respect to regions partitioning each of maps drawn on a plurality of scales involved with the same geographical area, an individual region index is designated to a region, in the manner that a region index for designating each region constituting a relatively large-scale map determines region indices for designating a plurality of regions constituting a map of a scale just below the relatively large-scale; and a map data file so that among regions designated by region indices, individual map data is designated by a scale and a region index, in the manner that each region having land in a corresponding scale map has corresponding map data and each region having no land in a corresponding scale map has no map data. A map management unit determines region indices corresponding to desired longitude and latitude and a scale applied from the external, and reads the map data corresponding to the desired scale and the determined region index from the map data base storage unit to then output the read data. A display unit displays the map data output from the map management unit. Accordingly, the present invention manages the map data involving the maps of various scales via the formalized index structure and the hierarchical structure. Thus, the size of the map index file can be minimized and the search of the map data can be simply performed via simple calculation. Also, a region is classified into one having land and the other having no land in each scale, which can enable constitution of the map data base with only geographically useful map data. Thus, a map data base can be efficiently constructed.

8 Claims, 10 Drawing Sheets

| | | |
|---|---|---|
| LONGITUDE AND LATITUDE RANGES, SCALE INDEX RANGE | | ← J1 |
| LONGITUDE AND LATITUDE OF 6 CENTER POSITIONS OF 1-TO-50,000 MAP OF CHEJU-DO AREA | | ← J2 |
| DATA STORAGE POSITION & DATA LENGTH OF THE MAP DATA OF A COMPLETE MAP OF KOREA | | ← J3 |
| DATA STORAGE POSITION AND DATA LENGTH, CORRESPONDING START REGION INDEX OF 1-TO-1,200,000 MAP (FOR REGION INDEX 1) | ••••• DATA STORAGE POSITION AND DATA LENGTH, CORRESPONDING START REGION INDEX OF 1-TO-1,200,000 MAP (FOR REGION INDEX 4) | ← J4 FOR (1-TO -1,200,000 MAP) |
| DATA STORAGE POSITION AND DATA LENGTH, CORRESPONDING START REGION INDEX OF 1-TO-200,000 MAP (FOR REGION INDEX 1) | ••••• DATA STORAGE POSITION AND DATA LENGTH, CORRESPONDING START REGION INDEX OF 1-TO-200,000 MAP (FOR REGION INDEX 24) | ← J5 FOR (1-TO -200,000 MAP) |
| DATA STORAGE POSITION AND DATA LENGTH, CORRESPONDING START REGION INDEX OF 1-TO-100,000 MAP (FOR REGION INDEX 1) | ••••• DATA STORAGE POSITION AND DATA LENGTH, CORRESPONDING START REGION INDEX OF 1-TO-100,000 MAP (FOR REGION INDEX 68) | ← J6 FOR (1-TO -100,000 MAP) |
| DATA STORAGE POSITION AND DATA LENGTH, CORRESPONDING START REGION INDICES IN 1-TO-25,000 & 1-TO-5,000 MAPS (FOR REGION INDEX 1) | ••••• DATA STORAGE POSITION AND DATA LENGTH, CORRESPONDING START REGION INDICES IN 1-TO-25,000 & 1-TO-5,000 MAPS (FOR REGION INDEX 262) | ← J7 FOR (1-TO -50,000 MAP) |
| DATA STORAGE POSITION AND DATA LENGTH (FOR REGION INDEX 1) | ••••• DATA STORAGE POSITION AND DATA LENGTH (FOR REGION INDEX 1048) | ← J8 FOR (1-TO -25,000 MAP) |
| DATA STORAGE POSITION AND DATA LENGTH (FOR REGION INDEX 1) | ••••• DATA STORAGE POSITION AND DATA LENGTH (FOR REGION INDEX 26200) | ← J9 FOR (1-TO -5,000 MAP) |

F1
F2

G1
G2

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

| MAP DATA OF A COMPLETE MAP OF KOREA | | | | |
|---|---|---|---|---|
| MAP DATA1 | MAP DATA2 | MAP DATA3 | MAP DATA4 | ← I2 (FOR 1:1,200,000 MAP) |
| MAP DATA1 | MAP DATA2 | ····· | MAP DATA 17 | MAP DATA 18 | ← I3 (FOR 1:200,000 MAP) |
| MAP DATA1 | MAP DATA2 | ····· | MAP DATA 63 | MAP DATA 64 | ← I4 (FOR 1:100,000 MAP) |
| MAP DATA1 | MAP DATA2 | ····· | MAP DATA 230 | MAP DATA 231 | ← I5 (FOR 1:50,000 MAP) |
| MAP DATA1 | MAP DATA2 | ····· | MAP DATA 728 | MAP DATA 729 | ← I6 (FOR 1:25,000 MAP) |
| MAP DATA1 | MAP DATA2 | ····· | MAP DATA 18224 | MAP DATA 18225 | ← I7 (FOR 1:5,000 MAP) |

| | |
|---|---|
| LONGITUDE AND LATITUDE RANGES, SCALE INDEX RANGE ← J1 | |
| LONGITUDE AND LATITUDE OF 6 CENTER POSITIONS OF 1-TO-50,000 MAP OF CHEJU-DO AREA ← J2 | |
| DATA STORAGE POSITION & DATA LENGTH OF THE MAP DATA OF A COMPLETE MAP OF KOREA ← J3 | |
| DATA STORAGE POSITION AND DATA LENGTH, CORRESPONDING START REGION INDEX OF 1-TO-1,200,000 MAP (FOR REGION INDEX 1) | DATA STORAGE POSITION AND DATA LENGTH, CORRESPONDING START REGION INDEX OF 1-TO-1,200,000 MAP (FOR REGION INDEX 4) ← J4 FOR (1-TO-1,200,000 MAP) |
| DATA STORAGE POSITION AND DATA LENGTH, CORRESPONDING START REGION INDEX OF 1-TO-200,000 MAP (FOR REGION INDEX 1) | DATA STORAGE POSITION AND DATA LENGTH, CORRESPONDING START REGION INDEX OF 1-TO-200,000 MAP (FOR REGION INDEX 24) ← J5 FOR (1-TO-200,000 MAP) |
| DATA STORAGE POSITION AND DATA LENGTH, CORRESPONDING START REGION INDEX OF 1-TO-100,000 MAP (FOR REGION INDEX 1) | DATA STORAGE POSITION AND DATA LENGTH, CORRESPONDING START REGION INDEX OF 1-TO-100,000 MAP (FOR REGION INDEX 68) ← J6 FOR (1-TO-100,000 MAP) |
| DATA STORAGE POSITION AND DATA LENGTH, CORRESPONDING START REGION INDICES IN 1-TO-25,000 & 1-TO-5,000 MAPS (FOR REGION INDEX 1) | DATA STORAGE POSITION AND DATA LENGTH, CORRESPONDING START REGION INDICES IN 1-TO-25,000 & 1-TO-5,000 MAPS (FOR REGION INDEX 262) ← J7 FOR (1-TO-50,000 MAP) |
| DATA STORAGE POSITION AND DATA LENGTH (FOR REGION INDEX 1) | DATA STORAGE POSITION AND DATA LENGTH (FOR REGION INDEX 1048) ← J8 FOR (1-TO-25,000 MAP) |
| DATA STORAGE POSITION AND DATA LENGTH (FOR REGION INDEX 1) | DATA STORAGE POSITION AND DATA LENGTH (FOR REGION INDEX 26200) ← J9 FOR (1-TO-5,000 MAP) |

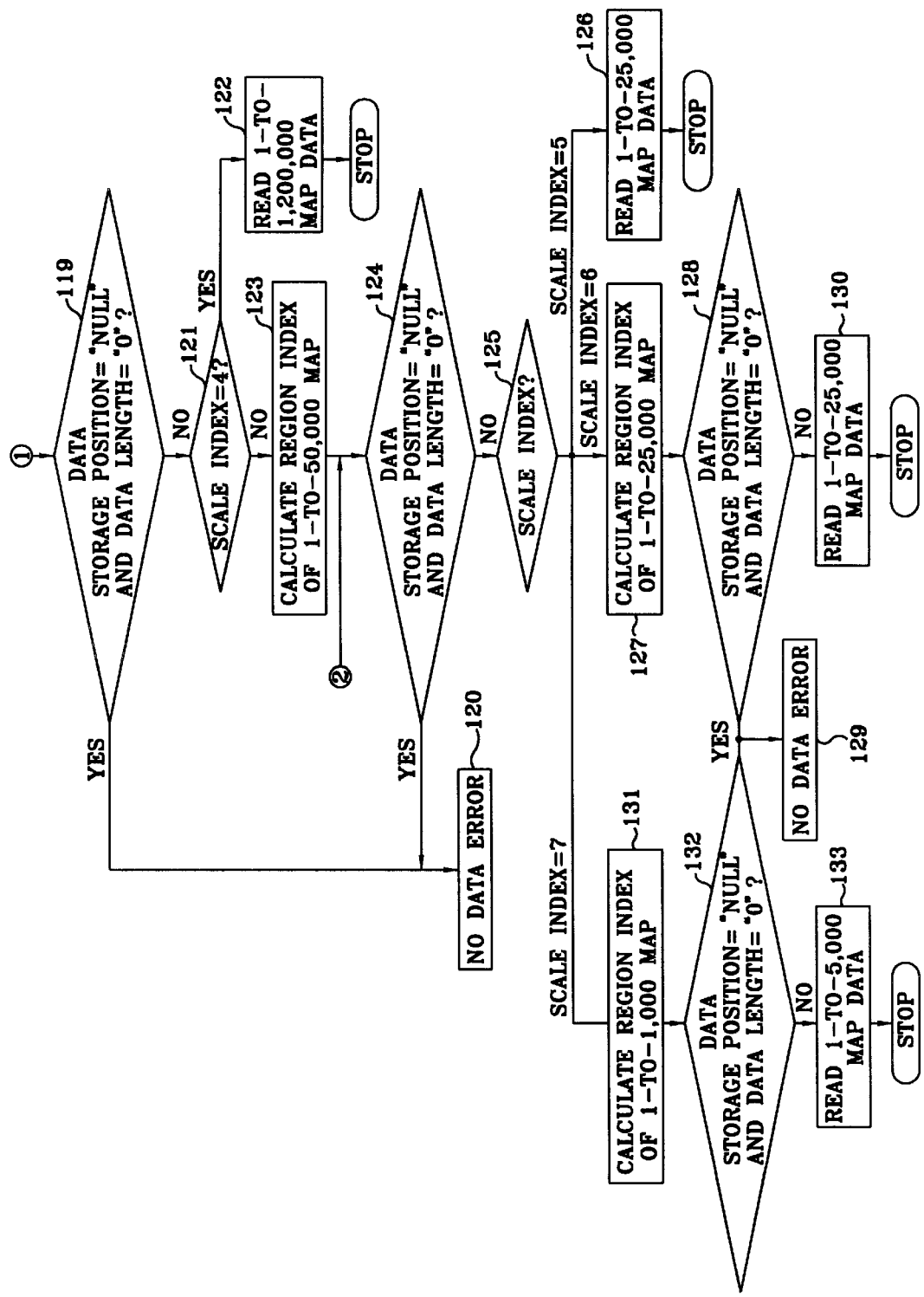

MAP DATA BASE MANAGEMENT METHOD AND SYSTEM THEREFOR

BACKGROUND OF THE INVENTION

The present invention relates to a map data base management method and a system therefor, and more particularly, to a map data base management method and a system therefor, for efficiently managing maps of various scales corresponding to one area.

There has recently been proposed a car navigation system and a geographical information system (GIS) as a multimedia technology for saving man power. A car navigation system is used for finding a current position of a car using driving distance and direction of the car.

A data base management system (DBMS) adopted in such a car navigation system and a geographical information system still uses a binary-tree form in the structure of searching an index. As a result, since a current index search method using a binary-tree structure is slow in its search speed, a map data base for various scales cannot be efficiently managed.

To solve the above problem, some car navigation systems use a data base management system having a formalized region-tree method and a hierarchical structure, which also has a slow search speed and is difficult to adapt itself to various areas.

SUMMARY OF THE INVENTION

To solve the above problems, it is an object of the present invention to provide a map data base management method for efficiently managing map data of various scales on an area basis and on a country basis, by searching map data of a corresponding region using a map data base in which indices are designated in the form of a hierarchical structure based on a geographical characteristic of each region.

It is another object of the present invention to provide a system embodying the above-described map data base management method.

To accomplish an object of the present invention, there is provided a map data base management method comprising the steps:

(a) constructing a map index file so that with respect to regions partitioning each of maps drawn on a plurality of scales involved with the same geographical area, an individual region index is designated to a region, in the manner that a region index for designating each region constituting a relatively large-scale map determines region indices for designating a plurality of regions constituting a map of a scale just below the relatively large-scale;

(b) constructing a map data file so that among regions designated by region indices in step (a), individual map data is designated by a scale and a region index, in the manner that each region having land in a corresponding scale map has corresponding map data and each region having no land in a corresponding scale map has no map data;

(c) determining a region index corresponding to desired longitude and latitude and scale, using the map index file in the step (a); and (d) reading map data corresponding to the desired scale and the region index determined in the step (c) from the map data file in the step (b), and displaying the read map data.

To accomplish another object of the present invention, there is provided a map data base management system comprising:

a map data base storage unit for storing a map index file so that with respect to regions partitioning each of maps drawn on a plurality of scales involved with the same geographical area, an individual region index is designated to a region, in the manner that a region index for designating each region constituting a relatively large-scale map determines region indices for designating a plurality of regions constituting a map of a scale just below the relatively large-scale, and a map data file so that among regions designated by region indices, individual map data is designated by a scale and a region index, in the manner that each region having land in a corresponding scale map has corresponding map data and each region having no land in a corresponding scale map has no map data; a map management unit for determining region indices corresponding to desired longitude and latitude and a scale applied from the external, and reading the map data corresponding to the desired scale and the determined region index from the map data base storage unit to then output the read data; and a display unit for displaying the map data output from the map management unit.

BRIEF DESCRIPTION OF THE DRAWINGS

FIG. 10 shows the structure of a map index file;

FIGS. 11A and 11B are flowchart diagrams for explaining an index searching method of map data in the system shown in FIG. 1.

DETAILED DESCRIPTION OF THE PREFERRED EMBODIMENTS

Preferred embodiments of the present invention will be described in detail with reference to the accompanying drawings.

Figure 1:
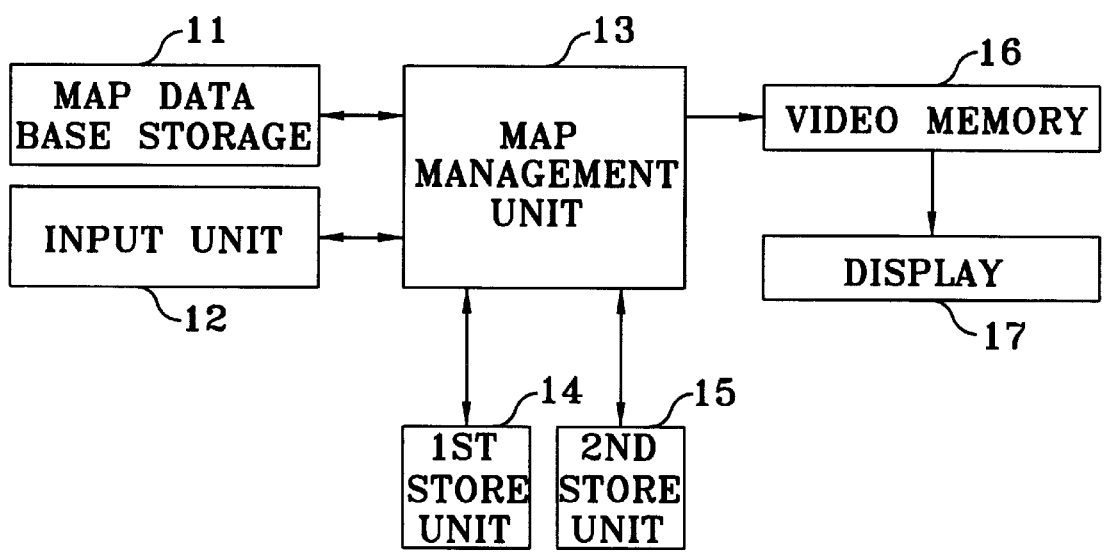
FIG. 1 is a block diagram showing a map data base management system according to a preferred embodiment of the present invention.

Referring to FIG. 1, a map data base management system according to an embodiment of the present invention includes a map data base storage unit 11 for storing map data of different scales and region indices corresponding to the map data in the form of files, and an input unit 12 for receiving a desired scale (or scale index) and longitude and latitude via an interface with a user. The map data base storage unit 11 is designed as a CD-ROM, a hard disk drive (HDD) and a RAM card. A map management unit 13, which is located between the map data base storage unit 11 and the input unit 12, manages the map data base stored in the map data base storage unit 11 and obtains map data corresponding to a desired scale and longitude and latitude. A first storage unit 14 and a second store 15 are connected to the map management unit 13. The first storage unit 14 stores a program and data for managing the map data base, and is implemented using a ROM. The second storage unit 15 temporarily stores a map index file read from the map data base storage unit 11 and is implemented using a RAM. A video memory 16 and a display 17 are connected to the map management unit 13, in order to display map data on a screen.

Among Korean maps on the basis of a 1-to-50,000 map defined by National Geography Institute, there are small-scale maps such as a 1-to-5,000 map and a 1-to-25,000 map and large-scale maps such as a 1-to-100,000 map, a 1-to-200,000 map, a 1-to-1,200,000 map and a complete map of Korea. In the embodiment of the present invention, scale indices for identifying maps of various scales are "1" for a complete map of Korea, "2" for a 1-to-1,200,000 map, "3" for a 1-to-200,000 map, "4" for a 1-to-100,000 map, "5" for a 1-to-50,000 map, "6" for a 1-to-25,000 map and "7" for a 1-to-5,000 map, respectively.

Maps of various scales in which region indices are designated according to the embodiment of the present invention will be described with reference to FIGS. 2 through 8. In case of region indices with respect to maps corresponding to various scales to be described with reference to FIGS. 2 through 8, one region index is designated for each of a number of regions constituting a map drawn on each scale so that with respect to a geographically same area, a region index associated with a relatively large-scale map corresponds to a plurality of region indices associated with a map having a scale just below the above large-scale. Also, a map data base is constituted so that a only map data with respect to a region where land exists is stored after dividing a map of each scale into regions with and without land, respectively. For convenience of explanation, although two islands, i.e., Dokto and Ullungdo belongs in the Korean territory, description of map data base management with respect to the above two Islands will be omitted.

Figure 2:
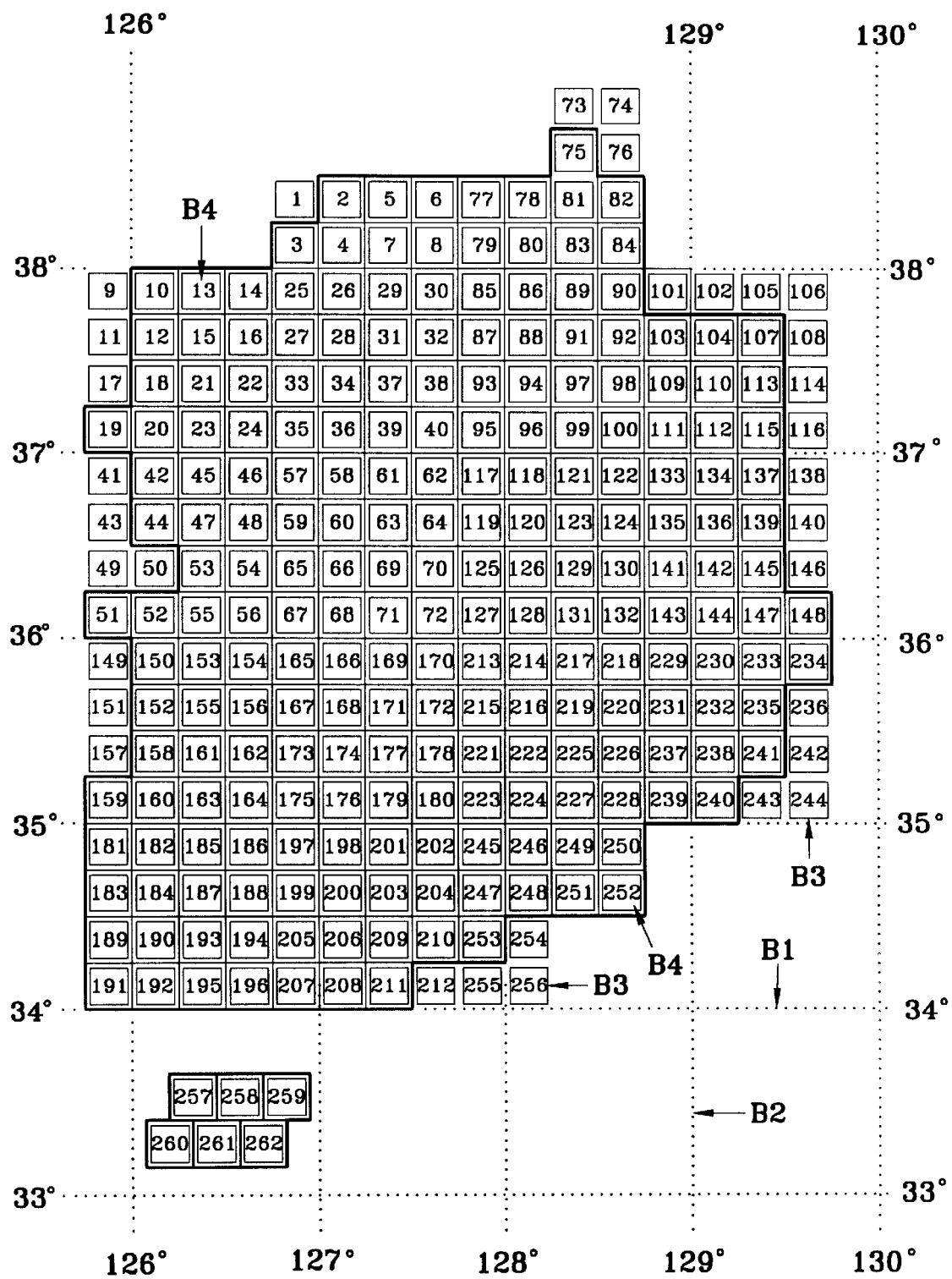
FIGS. 2 through 8 are views for explaining a relationship between map data and indices with respect to each scales of a Korean map.

FIG. 2 shows a map of Korea drawn on a scale of 1 to 50,000 in which region indices are designated according to the embodiment of the present invention. The horizontal line B1 indicates a latitude line and the vertical line B2 indicates a longitude line, respectively. "B3" indicates region indices with respect to regions having no map data, and B4 indicates region indices with respect to regions having map data. The region indices B3 and B4 are shown in FIG. 2 so that they are separated from each other by thick solid lines enclosing region indices B4.

Figure 3:
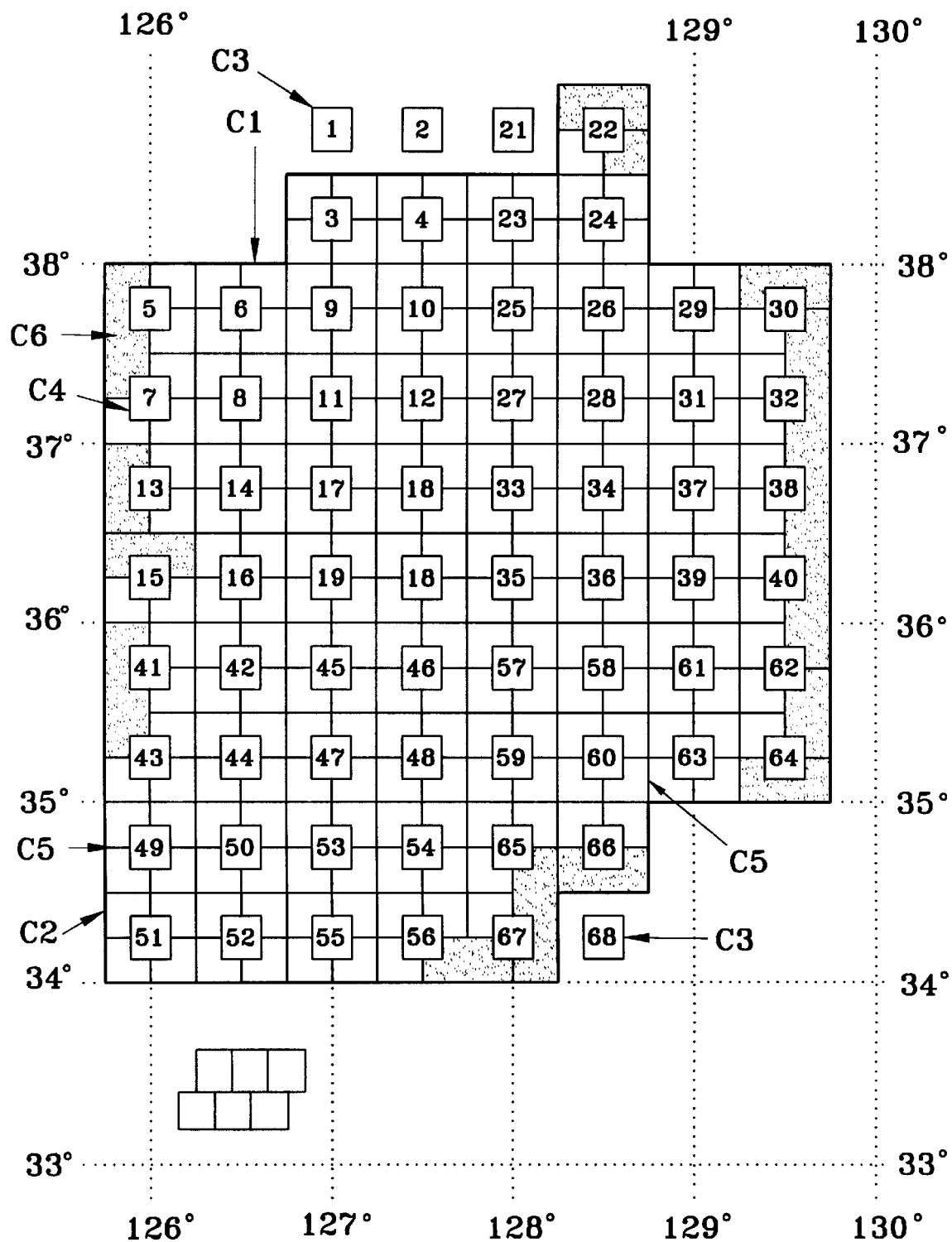

In FIG. 3 showing a map of Korea drawn on a scale of 1 to 100,000 and region indices with respect to the 1-to-100,000 map, the horizontal line C1 indicates a latitude line and the vertical line C2 indicates a longitude line, respectively. "C3" indicates region indices with respect to regions having no map data, and "C4" indicates region indices with respect to regions having map data. The region indices C3 and C4 are shown in FIG. 3 so that they are discriminated with each other by thick solid lines enclosing region indices C4. Each region index shown in the FIG. 3 map, designates regions on a 1-to-100,000 map corresponding to four region indices designated in a 1-to-50,000 map of FIG. 2. "C5" is a discrimination line for discriminating regions corresponding to the region indices B3 and B4 on the 1-to-50,000 map of FIG. 2, and "C6" being a shading portion shows regions on a 1-to-50,000 map indicated by the region indices B3.

Figure 4:
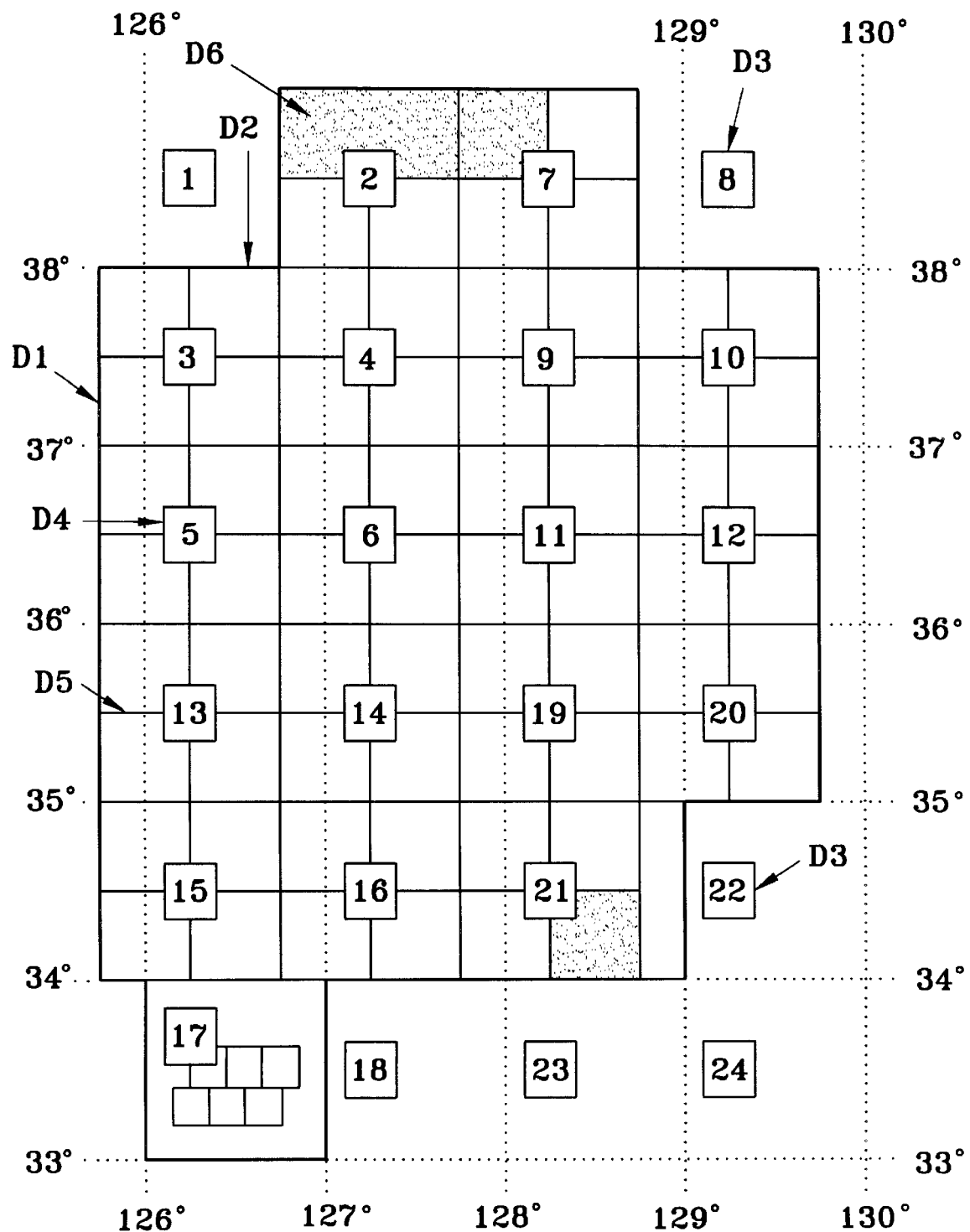

In case of the 1-to-200,000 map shown in FIG. 4, the vertical line D1 indicates a longitude line and the horizontal line D2 indicates a latitude line, respectively. "D3" indicates region indices with respect to regions having no map data, and "D4" indicates region indices with respect to regions having map data. The region indices D3 and D4 are shown in FIG. 4 so that they are discriminated with each other by thick solid lines enclosing region indices D4. In FIG. 4, reference numerals 1, 8, 18, 22, 23 and 24 are region indices D3. Each region index D3 or D4 shown in the FIG. 4 map, designates regions on a 1-to-200,000 map corresponding to four region indices involved in a 1-to-100,000 map of FIG. 3. An index D5 is a discrimination line for discriminating regions to be described in connection with the 1-to-100,000 map of FIG. 3, and an index D6 being a shading portion shows regions on a 1-to-100,000 map indicated by the region indices C3.

Figure 5:
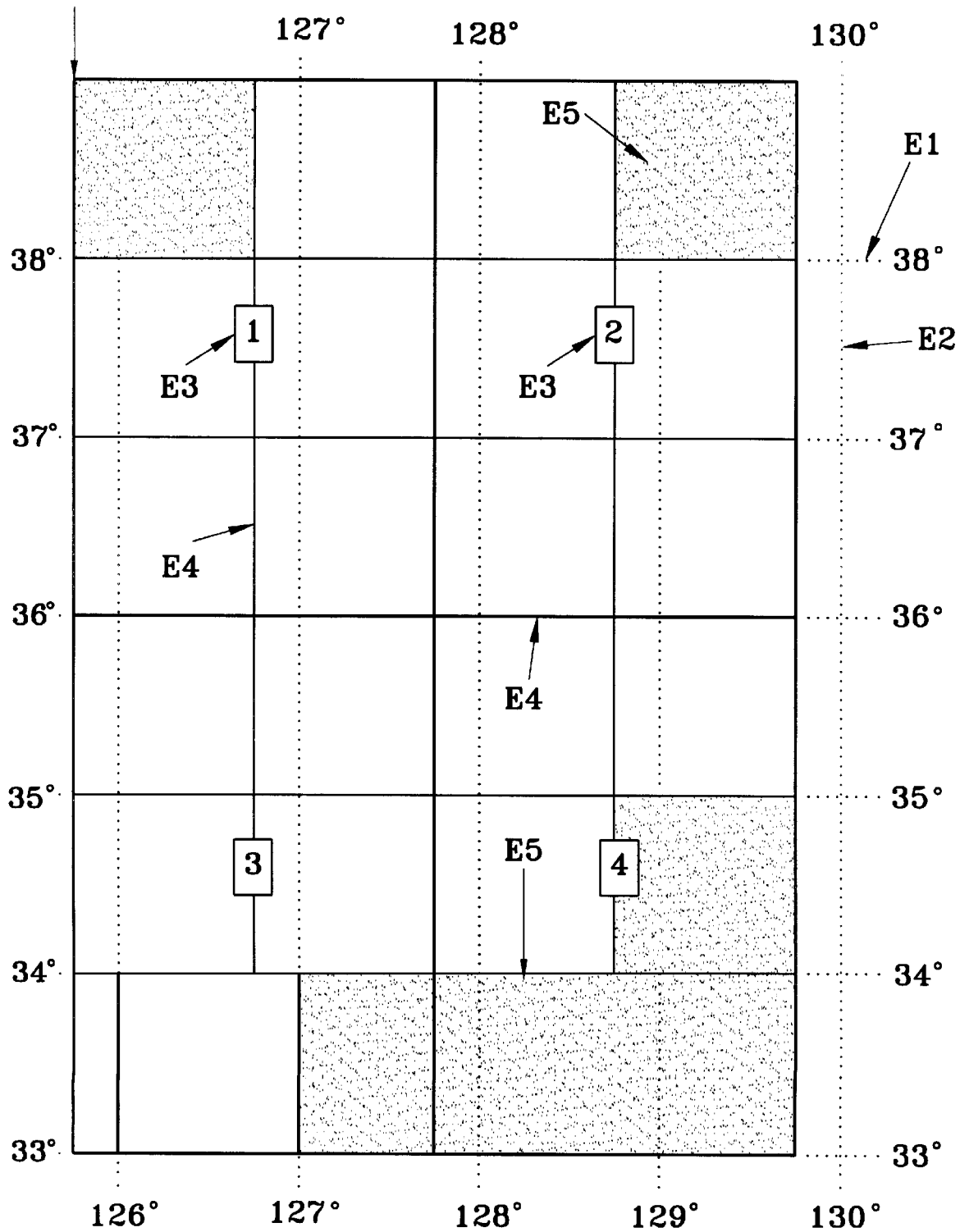

FIG. 5 shows a 1-to-1,200,000 map obtained by dividing a complete map of Korea by four and region indices with respect to the map. In FIG. 5, the horizontal line E1 indicates a latitude line and the vertical line E2 indicates a longitude axis, respectively. "E3" indicates region indices with respect to individual regions on a 1-to-1,200,000 map. One region on the 1-to-1,200,000 map corresponding to each region E3 is same as four regions on the 1-to-1,200,000 map corresponding to four regions indices D3 or D4. "E4" is a discrimination line for discriminating regions to be described in connection with the 1-to-200,000 map, and "E5" being a shading portion shows regions indicated corresponding to the region indices D3 on a 1-to-200,000 map.

Figures 6, 7:
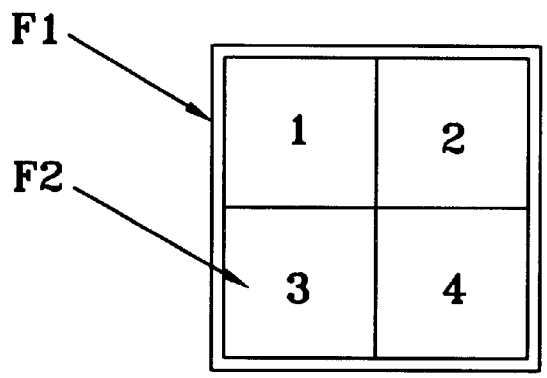

FIG. 6 shows that each region on the 1-to-50,000 map of FIG. 2 corresponding to the region index B3 or B4 corresponds to four regions on a 1-to-25,000 map. In FIG. 6, an index F1 means each region on a 1-to-50,000 map, and an index F2 means four regions of the region F1 which has been divided into the same size and having a scale of 1 to 25,000.

FIG. 7 shows that each region on the 1-to-50,000 map of FIG. 2 corresponds to 100 regions on a 1-to-5,000 map. In FIG. 7, "G1" means a region corresponding to each region index B4 on the 1-to-50,000 map of FIG. 2, and "G2" means region indices corresponding to 100 regions of the region G1 which has been divided into the same size. Each region corresponding to the G2 has a 1-to-5,000 scale.

Figures 8, 9:
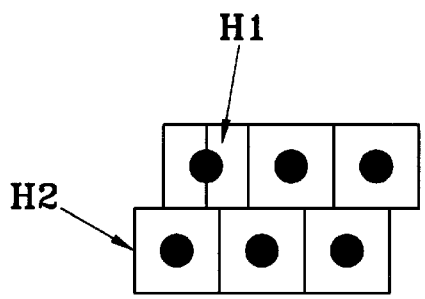
FIG. 9 shows the structure of a map data file.

FIG. 8 depicts a Cheju Island area having a scale of 1 to 50,000 shown in FIG. 2. In FIG. 8, darked circles H1 are center positions of six regions H2 divided from the 1-to-50,000 map of the Cheju Island area, respectively. The latitude and longitude of each center position H1 is (33° 30', 126° 22' 30"), (33° 30', 126° 37' 30"), (33° 30', 126° 52' 30") (33° 15', 126° 15'), (3 3° 15', 126° 30'), and (33° 15', 126° 45').

The region index of each scale and the map data of the corresponding regions which have been described with reference to FIGS. 2 through 8 with respect to the complete map of Korea, are stored in advance in the map data base storage unit 11 of FIG. 1 in the form of a map data file and a map index file to be described with reference to FIGS. 9 and 10.

The map data file of FIG. 9 is divided into areas I1 through I7 corresponding to scale indices 1 through 7, where a plurality of map data corresponding to each region index are positioned in each area. In the map data file, the area I1 designated by the scale index 1 stores the map data of the complete map of Korea. The area I2 designated by the scale index 2 stores the map data of the 1-to-1,200,000 map of FIG. 5. Therefore, the map data corresponding to four regions of the 1-to-1,200,000 map exists in the area I2. The area I3 of the scale index 3 stores the map data of the regions having the map data in FIG. 4, that is, the map data of 18 regions designated by the region indices D4. The area I4 of the scale index 4 stores the map data of the 64 regions designated by the region indices C4 among the 68 regions shown in FIG. 3. The area I5 of the scale index 5 stores the map data of the 231 regions designated by the region indices B4 among the 262 regions shown in FIG. 2. The area I6 of the scale index 6 stores the map data corresponding to the 729 regions having the map data when each of the 262 regions shown in FIG. 2 is divided into four regions on a 1-to-25,000 map. The area I7 of the scale index 7 stores the map data corresponding to the 18,225 regions having the map data when each of the 262 regions shown in FIG. 2 is divided into 100 regions having the same size on a 1-to-5,000 map.

The map index file shown in FIG. 10 includes areas J1 through J9 individually corresponding to the scale indices, where the respective areas J1 through J9 store data storage positions, data lengths and start region indices of the map data file of FIG. 9. The data storage position and the data length indicate the positions in which the map data corresponding to each of region indices involving each scale index is stored in the map data file of FIG. 9 and the lengths of the stored data, respectively. The start region index is a region index of a region having the lowest index value among a region on a map having a certain scale and the corresponding regions on a small scale map just less than the above scale. For example, the start region index stored in correspondence to the region index 2 on the 1-to-1,200,000 map of FIG. 5 becomes the region index 7 on the 1-to-200,000 map of FIG. 4.

Figure 11A:
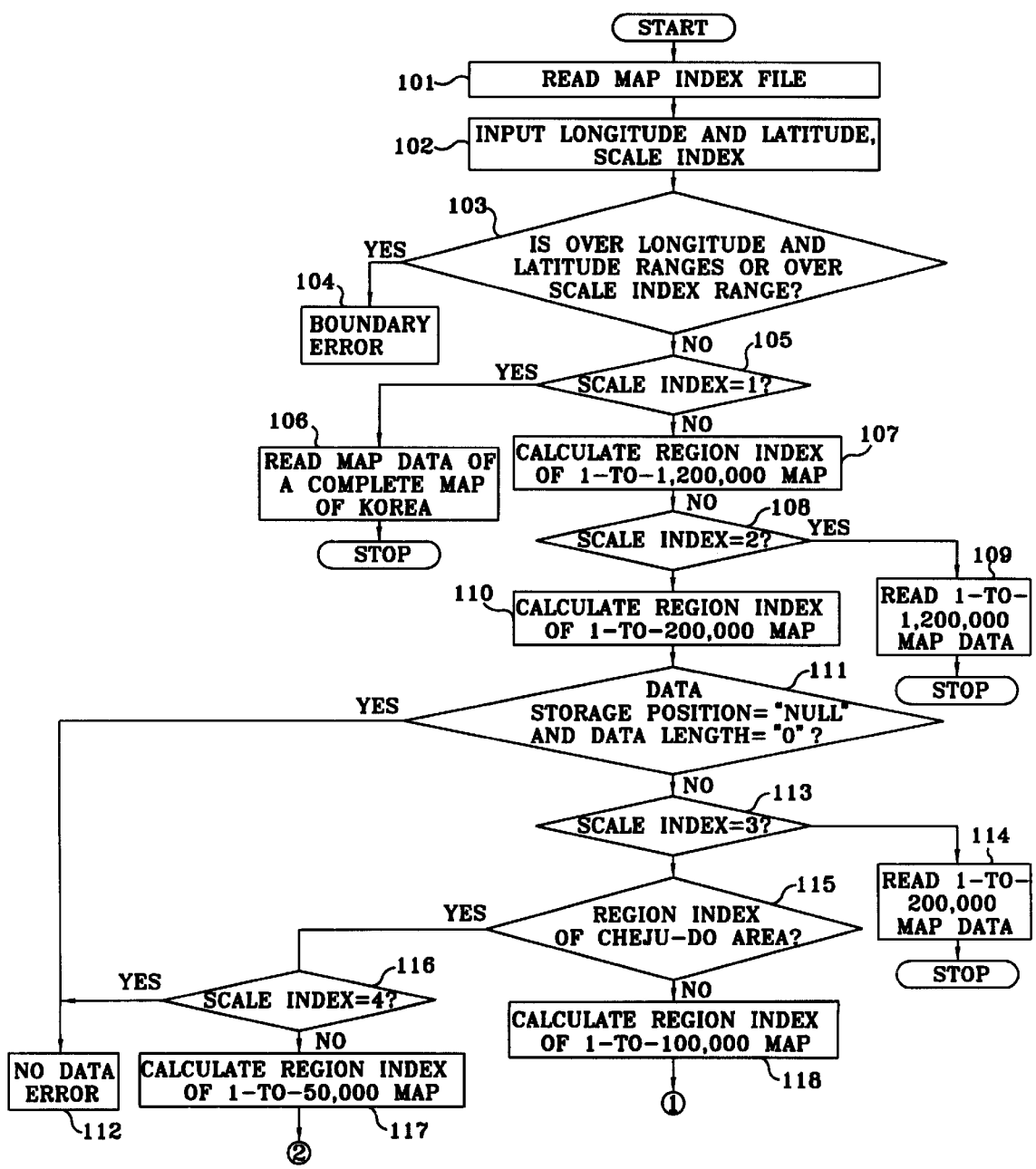

Referring to FIGS. 11A and 11B showing a flow-chart diagram of a process of managing a map data base in the map management unit 13, the map management unit 13 incorporating with a central processing unit (CPU) performs a map data search according to a map data base management program stored in the first storage unit 14. The map management unit 13 reads the map index file of FIG. 10 stored in the map data base storage unit 11 and stores the read result in the second store unit 15 (step 101). If a longitude and latitude and a scale index are supplied by user input from the input unit 12 in step 102, the map management unit 13 determines whether the received longitude and latitude and scale index are contained in a predetermined longitude and latitude range and scale index range stored in a area J1 of the map index file, in order to determine whether the map data of the longitude and latitude and scale to be found by a user are supported by the FIG. 1 system (step 103). When one of the received longitude and latitude and the scale index is beyond a corresponding predetermined range, the map management unit 13 processes this case as a boundary error (step 104). When the received longitude and latitude and the scale index exist in a predetermined map range and the scale index range, the map management unit 13 determines whether that the received scale index is "1" (step 105). The map management unit 13 reads the map data of a complete map of Korea from the map data base storage unit 11, using the storage position where the map data of the complete map of Korea is stored and the map data length information which are contained in the area J3 of the map index file stored in the second storage unit 15, when the received scale index is "1" (step 106). Then, the map management unit 13 displays the map data of the complete map of Korea on the display 17 via the video memory 16 so that a user can see it.

When the received scale index is not "1", the map management unit 13 calculates the region index involving the 1-to-1,200,000 map using the input longitude and latitude and the following equations (1) (step 107).

Longitude offset=Integer[$(X-125° 35')/2°$]

Latitude offset=Integer[$(39°-Y)/3°$]

Region index=Latitude offset×2+longitude offset+1       (1)

Here, X and Y are the input longitude and latitude, respectively. The 125° 35' and 39° are the longitude and latitude of a predetermined reference position in connection with the map of Korea, and 2° and 3° are a longitude interval and a latitude interval in each region formalized in the FIG. 5 map. Also, constants 2 and 1 in the region index calculation equation are a numerical difference in the region indices 3 and 2 to the latitude and longitude directions with respect to the start region index whose value is 1 in the FIG. 5 map, respectively. When the input latitude is 38° and the longitude is 127° as an example using the above equation (1), a longitude offset and a latitude offset of the 1-to-1,200,000 map are both zero. Thus, the value of the region index corresponding to the input longitude and latitude is 1.

When the region index with respect to the FIG. 5 1-to-1,200,000 map is calculated using the equations (1), the map management unit 13 determines whether the value of the input scale index is 2 (step 108). When the value of the scale index is 2, the map management unit 13 determines the data storage position and the length information corresponding to the input scale index and the region index calculated in the step 107, among the data contained in the area J4 of the map index file stored in the second storage unit 15, and reads the corresponding map data from the map data file stored in the map data base storage unit 11 using the determined data storage position and the length information (step 109). Then, the map management unit 13 displays the read map data on the display 17 via the video memory 16 so that user can see it. On the contrary, when the input scale index is not 2, the map management unit 13 calculates the region index corresponding to the input longitude and latitude using the following equations (2), with respect to the formalized 1-to-200,000 map described with reference to FIG. 4 (step 110).

Longitude offset=Integer[$((X-125° 35')$-longitude offset of 1:1,200,000 map×2°$)/1°$]

Latitude offset=Integer[$((39°-Y)$-latitude offset of 1:1,200,000 map×3°$)/1°$]

Region index=Latitude offset×2+longitude offset+start region index       (2)

Here, the 2° and 3° in the equation (2) are a longitude interval and a latitude interval in each region of the formalized FIG. 5 map, respectively. The 1° indicated in the denominator is a longitude interval and latitude interval in each region of the formalized FIG. 4 map, respectively. The factors 2 and 1 indicated in the right-hand side of the region index calculation equation are differences in number to the latitude and longitude directions with respect to the region index 1, respectively. Since each region index in the 1-to-1,200,000 map correspond to six region indices in the 1-to-200,000 map, the start region index in the 1-to-200,000 map corresponding to each region index in the 1-to-1,200,000 map becomes (corresponding region index of 1-to-1,200,000 map)×6−5. The start region index is stored in the corresponding position of the area J4. For example, when the input longitude and latitude is the longitude of 127° and the latitude of 38°, the longitude offset in the 1-to-200,000 map becomes 1 (=integer[$((127°-125° 35')-0×2°)/1°$]) and the latitude offset becomes 1 (=integer[$((39°-38°)-0×3°)/1°$]). Thus, the region index in the position to be found in the 1-to-200,000 map has a value of 4 (=1×2+1+1).

In step 110, the region index of the longitude and latitude in the FIG. 4 1-to-200,000 map is calculated using the equations (2), the map management unit 13 determines whether the data storage position corresponding to the calculated region index is null and the data length is defined as 0, using the corresponding data contained in the area J5 of the map index file stored in the second storage unit 15 (step 111). This is because the region index is designated even in the region having no map data in the 1-to-200,000 map as described in connection with FIG. 4. The map management unit 13 processes the case that the data storage position and the data length corresponding to the calculated region index are null and zero, respectively, as a data non-existence error (step 112).

Meanwhile, when the data storage position and the data length corresponding to the calculated region index are not null and zero, respectively, the map management unit 13 determines whether the input scale index is 3 (step 113). When the input scale index is 3, the map management unit 13 reads the corresponding map data from the map data base storage unit 11 (step 114), using the data storage position and the data length corresponding to the region index contained in the area J5 of the map index file and calculated in step 110. Then, the map management unit 13 displays the read map data on the display 17 via the video memory 16 so that user can see it. Meanwhile, when the input scale index is not 3, the map management unit 13 determines whether the calculated region index is 17 of a region index of the Cheju Island area (step 115). When the calculated region index is a region index of the Cheju Island area, the map management unit 13 determines whether the input scale index is 4 (step 116). If so, since there is no map data in the 1-to-100,000 map with respect to the Cheju Island area, the map management unit 13 processes it as the data non-existence error (step 112).

Meanwhile, when the scale index input in step 116 is not 4, the map management unit 13 calculates the region index corresponding to the input longitude and latitude, using the 1-to-50,000 map of the Cheju Island described with reference to FIG. 8 (step 117). The region index with respect to the informalized Cheju Island in the 1-to-50,000 map of step 117 calculated as follows:

(1) read each center coordinate of six 1-to-50,000 maps of the Cheju Island region stored in the area J2 of the map index file of FIG. 10;

(2) determines a center position having the closest longitude and latitude to the input longitude and latitude, using the longitude and latitude of the center positions H1 shown in FIG. 8 and the input longitude and latitude; and (3) determine the region index corresponding to the determined center position as the region index corresponding to the input longitude and latitude.

Thus, the region index becomes one of the indices 257 through 262 of the indices of FIG. 2.

When the position to be found is not the Cheju Island area in step 115, the map management unit 13 calculates the region index in the 1-to-100,000 map described with reference to FIG. 3 corresponding to the input longitude and latitude, using the following equation (3) involving the longitude offset, the latitude offset and the region index of the 1-to-100,000 map (step 118).

$$\text{Longitude offset} = \text{Integer}[((X - 125° \ 35') - \\ \text{longitude offset of } 1:1,200,000 \text{ map} \times 2° - \\ \text{longitude offset of } 1:200,000 \text{ map} \times 1°)/30']$$

$$\text{Latitude offset} = \text{Integer}[((39° - Y) - \\ \text{latitude offset of } 1:1,200,000 \text{ map} \times 3° - \\ \text{latitude offset of } 1:200,000 \text{ map} \times 1°)/30']$$

$$\text{Region index} = \text{Latitude offset} \times 2 + \text{longitude offset} + \\ \text{start region index}$$

(3)

Here, the 30' indicated in the denominator in the equations (3) is a longitude interval and latitude interval in each region of the formalized FIG. 3 1-to-100,000 map, respectively. The start region index used in calculation of the region index in the 1-to-100,000 map has the following relationship with respect to the region indices of the 1-to-200,000 map:

1. if the region index of the 1-to-200,000 map<8, start region index=corresponding region index of the 1-to-200,000 map×4-3-4;
2. if 8≦the region index of the 1-to-200,000 map<17, start region index=corresponding region index of the 1-to-200,000 map×4-3-8;
3. if 17≦the region index of the 1-to-200,000 map<22, start region index=corresponding region index of the 1-to-200,000 map×4-3-16; and
4. if 22<the region index of the 1-to-200,000 map≦24, no start region index exists.

For example, when the input longitude and latitude are 127° and 38°, respectively, the longitude offset of the 1-to-100,000 map is 0 {=integer[((127°−125° 35')−0×2°−1× 1°)/30']}, and the latitude offset is 0 {=integer[((39°−38°)− 0×3°−1×1°)/30']}. Thus, the region index in the 1-to-100, 000 map corresponding to the input longitude and latitude becomes 9 (=0×2+0+9).

If the region index of the 1-to-100,000 map of FIG. 3 is calculated using the equations (3) in step 118, the map management unit 13 determines whether the data storage position corresponding to the calculated region index is null and the data length is defined as 0, using the corresponding data contained in the area J6 of the map index file stored in the second storage unit 15 (step 119). This is because the region index is designated even in the region having no map data in the 1-to-100,000 map as described in connection with FIG. 3. The map management unit 13 processes the case that the data storage position and the data length corresponding to the calculated region index are null and zero, respectively, as a data non-existence error (step 120).

Meanwhile, when the data storage position and the data length corresponding to the calculated region index are not null and zero, respectively, the map management unit 13 determines whether the input scale index is 4 (step 121). When the input scale index is 4, the map management unit 13 reads the corresponding map data from the map data base storage unit 11, using the data storage position and the data length corresponding to the region index defined in the area J6 of the map index file stored in the second storage unit 15 and calculated in step 118 (step 122). Then, the map management unit 13 displays the read map data on the display 17 via the video memory 16 so that user can see it. Meanwhile, when the input scale index is not 4, the map management unit 13 calculates the region index corresponding to the input longitude and latitude, using the 1-to-50,000 map described with reference to FIG. 8 using the following equation (4) involving the longitude offset, the latitude offset and the region index of the 1-to-50,000 map (step 123).

$$\text{Longitude offset} = \text{Integer}[((X - 125° \ 35') - \\ \text{longitude offset of } 1:1,200,000 \text{ map} \times 2° - \\ \text{longitude offset of } 1:200,000 \text{ map} \times 1° - \\ \text{longitude offset of } 1:100,000 \text{ map} \times 30')/15']$$

$$\text{Latitude offset} = \text{Integer}[((39° - Y) - \\ \text{latitude offset of } 1:1,200,000 \text{ map} \times 3° - \\ \text{latitude offset of } 1:200,000 \text{ map} \times 1° - \\ \text{latitude offset of } 1:100,000 \text{ map} \times 30')/15']$$

$$\text{Region index} = \text{Latitude offset} \times 2 + \text{longitude offset} + \\ \text{start region index}$$

(4)

Here, the 15' indicated in the denominator of the longitude and latitude offset calculation equation (4) is a longitude interval and latitude interval in each region of the 1-to-500, 000 map of FIG. 2, respectively. The region index in the 1-to-50,000 map has the following relationship with respect to the region indices of the 1-to-100,000 map:

1. if the region index of the 1-to-100,000 map<21, start region index=corresponding region index of the 1-to-100,000 map×4-3-8;
2. if 22≦the region index of the 1-to-100,000 map≦67, start region index=corresponding region index of the 1-to-100,000 map×4-3-12;
3. if the region index of the 1-to-100,000 map=68, there is not map data in the 1-to-50,000 map.

After performing the step 123 or 117, the map management unit 13 determines whether the data storage position corresponding to the calculated region index is null and the data length is defined as 0, using the corresponding data contained in the area J7 of the FIG. 10 map index file stored in the second storage unit 15 (step 124). This is because the region index is designated even in the region having no map data in the 1-to-50,000 map as described in connection with FIG. 2. The map management unit 13 processes the case that the data storage position and the data length corresponding to the calculated region index are null and zero, respectively, as a data non-existence error (step 120).

On the contrary, when the data storage position and the data length corresponding to the calculated region index are not null and zero, respectively, the map management unit 13 determines which of 5, 6 and 7 is the input scale index (step 125). When the input scale index is 5, the map management unit 13 reads the corresponding map data from the map data base storage unit 11 which stores the map data file (step 126), using the data storage position and the data length corresponding to the region index calculated in step 123 or step 117, which are defined in the area J7 of the map index file stored in the second storage unit 15. Then, the map management unit 13 displays the read map data on the display 17 via the video memory 16 so that user can see it.

Meanwhile, if the input scale index is judged as 6 in step 125, the map management unit 13 performs step 127. In step 127, the map management unit 13 determines whether the region index calculated in step 117 or 123 is the region index involving the 1-to-50,000 map of the Cheju Island area (step 127). The map management unit 13 can be modified to determine whether it belongs to the Cheju Island area using the input longitude and latitude. When the input scale index is determined that it is not the region index of the Cheju Island area, the map management unit 13 calculates the region index in the 1-to-25,000 map corresponding to the input longitude and latitude, using the following equation (5).

$$\text{Longitude offset} = \text{Integer}[((X - 125° 35') -$$
$$\text{longitude offset of } 1:1{,}200{,}000 \text{ map} \times 2° -$$
$$\text{longitude offset of } 1:200{,}000 \text{ map} \times 1° -$$
$$\text{longitude offset of } 1:100{,}000 \text{ map} \times 30' -$$
$$\text{longitude offset of } 1:50{,}000 \text{ map} \times 15')/7' 30'']$$

$$\text{Latitude offset} = \text{Integer}[((39° - Y) -$$
$$\text{latitude offset of } 1:1{,}200{,}000 \text{ map} \times 3° -$$
$$\text{latitude offset of } 1:200{,}000 \text{ map} \times 1° -$$
$$\text{latitude offset of } 1:100{,}000 \text{ map} \times 30' -$$
$$\text{latitude offset of } 1:50{,}000 \text{ map} \times 15')/7' 30'']$$

$$\text{Region index} = \text{Latitude offset} \times 10 + \text{longitude offset} +$$
$$\text{start region index} \quad (5)$$

Here, the 7' 30" indicated in the denominators of the longitude and latitude offset calculation equations (5) are a longitude interval and latitude interval in the region corresponding to each region index of the 1-to-25,000 map, respectively. Also, since the region indices involving the 1-to-25,000 map are formalized in the form where four region indices correspond to one region index involving the 1-to-50,000 map, the start region index of the 1-to-25,000 map becomes the corresponding region index of the 1-to-50,000 map×4-3.

However, if the region index calculated in step 117 or 123 is determined as the region index involving the 1-to-50,000 map showing the Cheju Island, the map management unit 13 determines whether the region index calculated in connection with the 1-to-50,000 map belongs to which one of a class of 157 through 259 and the other class of 260 through 262. If the calculated region index is one of 257 through 259, the map management unit 13 calculates the region index on the 1-to-25,000 map corresponding to the input longitude and latitude, using the following equations (6).

$$\text{Longitude offset} = \text{Integer}[((X - 126° 15') - (\text{region index of } 1{:}50{,}000 \text{ map} - 257) \times 15')/7' 30'']$$

$$\text{Latitude offset} = \text{Integer}[((33° 37' 30'' - Y)/7' 30'']$$

$$\text{Region index} = \text{Latitude offset} \times 2 + \text{longitude offset} + \text{start region index} \quad (6)$$

Meanwhile, if the calculated region index is one of 257 through 259 of the 1-to-50,000 map, the map management unit 13 calculates the region index on the 1-to-25,000 map corresponding to the input longitude and latitude, using the following equations (7).

$$\text{Longitude offset} = \text{Integer}[((X - 126° 7' 30'') - (\text{region index of } 1{:}50{,}000 \text{ map} - 260) \times 15')/7' 30'']$$

$$\text{Latitude offset} = \text{Integer}[((33° 22' 30'' - Y)/7' 30'']$$

$$\text{Region index} = \text{Latitude offset} \times 2 + \text{longitude offset} + \text{start region index} \quad (7)$$

Using the above equations (6) and (7), the region indices of the 1-to-25,000 map from the 1025 to 1048 can be obtained.

If the region index of the 1-to-25,000 map corresponding to the input longitude and latitude is calculated using the equations (5), (6) or (7), the map management unit 13 determines whether the data storage position corresponding to the calculated region index is null and the data length is defined as 0, from the area J8 of the map index file stored in the second storage unit 15 (step 128). If the data storage position and the data length are null and zero, respectively, the map management unit 13 processes it as a data non-existence error (step 129).

Meanwhile, when the data storage position and the data length corresponding to the calculated region index are not null and zero, respectively, the map management unit 13 reads the data storage position and the data length corresponding to the region index calculated in step 127 from the area J8 of the map index file stored in the second storage unit 15. Using the data storage position and the length information, the map management unit 13 reads the map data corresponding to the map data file stored in the map data base storage unit 11 (step 130). Then, the map management unit 13 displays the read map data on the display 17 via the video memory 16 so that user can see it.

Meanwhile, if the input scale index is determined as 7 in step 125, the map management unit 13 determines whether the region index calculated in step 117 or 123 is the region index involving the 1-to-50,000 map of the Cheju Island. When the input scale index is determined that it is not the region index of the Cheju Island region, the map management unit 13 calculates the region index in the 1-to-5,000 map corresponding to the input longitude and latitude and described with reference to FIG. 7, using the following equations (8) (step 131).

$$\begin{aligned}\text{Longitude offset} = \text{Integer}[((X - 125° \; 35') - \\ \text{longitude offset of } 1:1{,}200{,}000 \text{ map} \times 2° - \\ \text{longitude offset of } 1:200{,}000 \text{ map} \times 1° - \\ \text{longitude offset of } 1:100{,}000 \text{ map} \times 30' - \\ \text{longitude offset of } 1:50{,}000 \text{ map} \times 15')/1' \; 30''] \\ \text{Latitude offset} = \text{Integer}[((39° \; - Y) - \\ \text{latitude offset of } 1:1{,}200{,}000 \text{ map} \times 3° - \\ \text{latitude offset of } 1:200{,}000 \text{ map} \times 1° - \\ \text{latitude offset of } 1:100{,}000 \text{ map} \times 30' - \\ \text{latitude offset of } 1:50{,}000 \text{ map} \times 15')/1' \; 30''] \\ \text{Region index} = \text{Latitude offset} \times 10 + \text{longitude offset} + \\ \text{start region index}\end{aligned} \quad (8)$$

Here, the 1' 30" indicated in the denominators of the longitude and latitude offset calculation equation (8) are a longitude interval and a latitude interval in the region corresponding to each region index of the 1-to-5,000 map, respectively. Also, since the region indices involving the 1-to-5,000 map are formalized in the form where 100 region indices correspond to one region index involving the 1-to-50,000 map, the start region index of the 1-to-5,000 map becomes the corresponding region index of the 1-to-50,000 map×100-99.

Meanwhile, if the calculated region index is one of 257 through 259, the map management unit 13 determines whether the region index calculated in connection with the 1-to-50,000 map belongs to which one of a class of 257 through 259 and the other class of 260 through 262. If the calculated region index is one of 257 through 259, the map management unit 13 calculates the region index on the 1-to-5,000 map of Cheju Island corresponding to the input longitude and latitude, using the following equations (9).

$$\begin{aligned}\text{Longitude offset} = \text{Integer}[((X-126° \; 7')-(\text{region index of } 1{:}50{,}000 \\ \text{map}-257)\times 15')/1' \; 30''] \\ \text{Latitude offset} = \text{Integer}[((33° \; 37' \; 30''-Y)/1' \; 30''] \\ \text{Region index} = \text{Latitude offset} \times 10 + \text{longitude offset} + \text{start region} \\ \text{index}\end{aligned} \quad (9)$$

Meanwhile, if the region index of the 1-to-50,000 map is one of 260 through 262, the map management unit 13 calculates the region index of the 1-to-5,000 map using the following equation (10).

$$\begin{aligned}\text{Longitude offset} = \text{Integer}[((X-126° \; 7' \; 30'')-(\text{region index of } 1{:}50{,} \\ 000 \text{ map}-260)\times 15')/1' \; 30''] \\ \text{Latitude offset} = \text{Integer}[((33° \; 22' \; 30''-Y)/1' \; 30''] \\ \text{Region index} = \text{Latitude offset} \times 10 + \text{longitude offset} + \text{start region} \\ \text{index}\end{aligned} \quad (10)$$

If the region index of the 1-to-5,000 map corresponding to the input longitude and latitude is calculated using the equations (8), (9) or (10) (step 131), the map management unit 13 determines whether the data storage position corresponding to the calculated region index is null and the data length is defined as 0, among the data storage positions and the data lengths stored in the area J9 of the map index file stored in the second storage unit 15 (step 132). This is because the region index exists even in the region having no map data of the 1-to-5,000 map. If the data storage position and the data length are null and zero, respectively, the map management unit 13 processes it as a data non-existence error (step 129).

Meanwhile, when the data storage position and the data length corresponding to the calculated region index are not null and zero, respectively, the map management unit 13 determines the data storage position and the data length corresponding to the region index calculated in step 132 among the data stored in the area J9 of the map index file of the second storage unit 15. Using the determined data storage position and the length information, the map management unit 13 reads the map data from the map data file stored in the map data base storage unit 11 (step 133). Then, the map management unit 13 displays the read map data on the display 17 via the video memory 16 so that user can see it.

As described above, the map data base management method and the system therefor according to the present invention manages the map data involving the maps of various scales via the formalized index structure and the hierarchical structure. Thus, the size of the map index file can be minimized and the search of the map data can be simply performed via simple calculation. Also, a region is classified into one having land and the other having no land in each scale, which can enable constitution of the map data base with only geographically useful map data. Thus, a map data base can be efficiently constructed.

While only certain embodiments of the invention have been specifically described herein, it will be apparent that numerous modifications may be made thereto without departing from the spirit and scope of the invention.

What is claimed is:

1. A map data base management method comprising the steps:
    (a) constructing a map index file including region indices designated for each of a plurality of regions partitioning maps drawn on a plurality of scales for a same geographical area, wherein a region index designating each region of a large-scale map determines region indices designating a plurality of regions of a map of a smaller scale than that of the large-scale map;
    (b) constructing a map data file wherein among regions designated by region indices in step (a), individual map data is designated by a scale and a region index, and only regions having land in a corresponding scale map have corresponding map data;
    (c) determining a region index corresponding to a desired longitude and latitude and a desired scale, using the map index file; and
    (d) reading and displaying map data corresponding to a desired scale and the region index determined in step (c) from the map data file.

2. The map data base management method according to claim 1,
    wherein said map index file contains a predetermined longitude and latitude range and a predetermined scale range, and map data storage positions, map data lengths, and start region indices of the map data file corresponding to each scale and region index, and wherein each of the start region indices is a number which is determined by the corresponding region index, and the number of regions for partitioning a map of a smaller scale by which the region corresponding to each scale and region index is divided.

3. The map data base management method according to claim 2, wherein said step (c) comprising the sub-steps of:
(c1) determining whether the desired longitude and latitude or the desired scale is within the predetermined longitude and latitude range or the predetermined scale range, respectively; and
(c2) determining, in sequence, a region index corresponding to the desired longitude and latitude and the desired scale from a larder scale map to a smaller map, when it is determined that the desired longitude and latitude and the desired scale are within the predetermined longitude and latitude range and the predetermined scale range in step (c1).

4. The map data base management method according to claim 3, wherein said step (c2) further comprises calculating the region index corresponding to the desired longitude and latitude and the desired scale, using a corresponding start region index, and a longitude interval and a latitude interval indicated on a scale map with regard to each region corresponding to the desired longitude and latitude.

5. A map data base management system comprising:
a map data base storage unit for storing a map index file including region indices designated for each of a plurality of regions partitioning maps drawn on a plurality of scales for a same geographical area, wherein a region index designating each region of a large-scale map determines region indices designating a plurality of regions of a map of a smaller scale than that of the large-scale map, and
a map data file wherein among regions designated by region indices, individual map data is designated by a scale and a region index, only regions having land in a corresponding scale map have corresponding map data;
a map management unit for determining a region index corresponding to a desired longitude and latitude and a desired scale, and reading and outputting map data corresponding to the desired scale and a determined region index from the map data base storage unit; and
a display unit for displaying the map data output from said map management unit.

6. The map data base management system according to claim 5, wherein said map index file contains a predetermined longitude and latitude range and a predetermined scale range, and map data storage positions, map data lengths, and start region indices of the map data file corresponding to each scale and region index, and
wherein each of the start region indices is a number which is determined by the corresponding region index, and the number of regions for partitioning a map of a smaller scale by which the region corresponding to each scale and region index is divided.

7. The map data base management system according to claim 6, wherein said map management unit determines whether the desired longitude and latitude or the desired scale is within the predetermined longitude and latitude range or the predetermined scale range, respectively, and
determines, in sequence, a region index corresponding to the desired longitude and latitude and the desired scale from a larger scale map to a smaller scale map, when it is determined that the desired longitude and latitude and the desired scale are within the predetermined longitude and latitude range and the predetermined scale range.

8. The map data base management system according to claim 7, wherein said map management unit calculates the region index corresponding to the desired longitude and latitude and the desired scale, using a corresponding start region index and a longitude interval and a latitude interval indicated on a scale map with regard to each region corresponding to the desired longitude and latitude.

* * * * *